US008333663B2

(12) United States Patent
Izumi (10) Patent No.: US 8,333,663 B2
(45) Date of Patent: Dec. 18, 2012

(54) GAME DEVICE, METHOD OF CONTROLLING GAME DEVICE, PROGRAM, AND INFORMATION STORAGE MEDIUM

(75) Inventor: Tadakatsu Izumi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 197 days.

(21) Appl. No.: 12/918,223

(22) PCT Filed: Dec. 24, 2008

(86) PCT No.: PCT/JP2008/073428
§ 371 (c)(1),
(2), (4) Date: Aug. 18, 2010

(87) PCT Pub. No.: WO2009/104342
PCT Pub. Date: Aug. 27, 2009

(65) Prior Publication Data
US 2010/0317439 A1 Dec. 16, 2010

(30) Foreign Application Priority Data

Feb. 20, 2008 (JP) .................................. 2008-038227

(51) Int. Cl.
*A63F 9/24* (2006.01)
(52) U.S. Cl. .......... 463/36; 473/467; 473/447; 473/415; 473/409; 273/292
(58) Field of Classification Search .................. None
See application file for complete search history.

(56) References Cited

U.S. PATENT DOCUMENTS

| 2003/0054905 A1* | 3/2003 | King, Jr. ................... 473/467 |
| 2003/0060310 A1* | 3/2003 | Strong ...................... 473/447 |
| 2004/0198509 A1* | 10/2004 | Bellehumeur et al. ........ 472/92 |
| 2005/0161883 A1* | 7/2005 | Lipscomb ................... 273/292 |
| 2006/0189416 A1* | 8/2006 | Nelson ....................... 473/415 |
| 2006/0226959 A1* | 10/2006 | Gorman et al. ........... 340/323 R |
| 2007/0049427 A1* | 3/2007 | Wells ........................ 473/447 |
| 2008/0085791 A1* | 4/2008 | Bucalo ...................... 473/490 |
| 2008/0182675 A1* | 7/2008 | Flores ......................... 473/27 |
| 2009/0239685 A1* | 9/2009 | Belton et al. ............... 473/409 |

FOREIGN PATENT DOCUMENTS

| JP | 10-211361 A | 8/1998 |
| JP | 3736589 B2 | 8/1998 |
| JP | 2004-202007 A | 7/2004 |
| JP | 2005-000248 A | 1/2005 |
| JP | 2006-122407 A | 5/2006 |
| WO | 2008/018513 A1 | 2/2008 |

* cited by examiner

*Primary Examiner* — Paul A D'Agostino
(74) *Attorney, Agent, or Firm* — Sughrue Mion, PLLC

(57) ABSTRACT

To provide a game device capable of allowing a user to feel a difference in state of mind between a player of a winning team and a player of a losing team when defending. A selection unit (56) selects one or more player characters from among the player characters belonging to a team not in possession of a moving object. In a case where control by a first player character control unit (58) is applied, a determination unit (62) determines whether or not a reference period has elapsed after a given reference time. In a case where elapse of the predetermined period after the reference time is determined, a switching unit (66) switches the state in which control by the first player character control unit (58) is applied to a state in which control by a second player character control unit (60) is applied. A reference period data control unit (64) changes the length of the reference period, based on game state information.

17 Claims, 8 Drawing Sheets

| SCORE DIFFERENCE | REFERENCE PERIOD |
|---|---|
| −2 OR SMALLER | T1 |
| −1 | T2 |
| 0 | T3 |
| +1 | T4 |
| +2 OR LARGER | T5 |

GAME DEVICE, METHOD OF CONTROLLING GAME DEVICE, PROGRAM, AND INFORMATION STORAGE MEDIUM

TECHNICAL FIELD

The present invention relates to a game device, a method of controlling a game device, a program, and an information storage medium.

BACKGROUND ART

There is known a game device for carrying out a game (sport game) of a sport to be performed between a first team and a second team, using a moving object, such as a ball, or the like. For example, there is known a game device for carrying out a soccer game, a basket ball game, an ice hockey game, and the like. In such a game device, when a player character belonging to one team is in possession of a moving object, control is carried out such that a player character belonging to the other team defends against the player character in possession of the moving object.
Patent Document 1: JP 2005-000248 A

DISCLOSURE OF THE INVENTION

Problems to be Solved by the Invention

In an actual sport match, a player belonging to a winning team can defend with plenty of poise, while a player belonging to a losing team cannot. If an arrangement for allowing a user to feel such a difference in the state of mind between a player of a winning team and a player of a losing team when defending is possible, the reality of a sport game, such as is described above, can be improved.

The present invention has been conceived in view of the above, and an object thereof is to provide a game device, a method of controlling a game device, a program, and an information storage medium capable of allowing a user to feel a difference in the state of mind between a player of a winning team and a player of a losing team when defending.

Means for Solving the Problems

In order to achieve the above described object, a game device according to the present invention is a game device for carrying out a game of a sport to be performed between a first team and a second team, using a moving object, comprising: game state information storage means for storing game state information describing a game state; selection means for, in a case where a player character belonging to one team is in possession of the moving object, selecting one or more player characters from among player characters belonging to another team; first player character control means for moving the player character selected by the selection means, based on a position of the moving object or the player character in possession of the moving object, while restricting movement of the player character selected by the selection means so that a distance between the moving object or the player character in possession of the moving object, and the player character selected by the selection means, is kept equal to or longer than a predetermined distance; second player character control means for moving the player character selected by the selection means, based on the position of the moving object or the player character in possession of the moving object, such that the player character selected by the selection means approaches the moving object or the player character in possession of the moving object; determination means for determining, in a case where control by the first player character control means is applied, whether or not a reference period has elapsed after a given reference time; and switching means for, in a case where it is determined that the reference period has elapsed after the reference time, switching a state in which control by the first player character control means is applied to a state in which control by the second player character control means is applied, wherein the determination means includes reference period control means for changing a length of the reference period, based on the game state information.

Also, a game device control method according to the present invention is a control method for controlling a game device for carrying out a game of a sport to be performed between a first team and a second team, using a moving object, the method comprising a step of reading content stored in a game state information storage means storing game state information describing a game state; a selection step of, in a case where a player character belonging to one team is in possession of the moving object, selecting one or more player characters from among player characters belonging to another team; a first player character control step of moving the player character selected at the selection step, based on a position of the moving object or the player character in possession of the moving object, while restricting movement of the player character selected at the selection step so that a distance between the moving object or the player character in possession of the moving object, and the player character selected at the selection step, is kept equal to or longer than a predetermined distance; a second player character control step of moving the player character selected at the selection step, based on the position of the moving object or the player character in possession of the moving object, such that the player character selected at the selection step approaches the moving object or the player character in possession of the moving object; a determination step of determining, in a case where control at the first player character control step is applied, whether or not a reference period has elapsed after a given reference time; and a switching step of, in a case where it is determined that the reference period has elapsed after the reference time, switching a state in which control at the first player character control step is applied to a state in which control at the second player character control step is applied, wherein the determination step includes a reference period control step of changing a length of the reference period, based on the game state information.

A program according to the present invention is a program for causing a computer, such as a consumer game device (an installation type game device), a portable game device, a commercial game device, a portable phone, a personal digital assistant (PDA), a personal computer, and so forth, to function as a game device for carrying out a game of a sport to be performed between a first team and a second team, using a moving object, the program for causing the computer to function as game state information storage means for storing game state information describing a game state; selection means for, in a case where a player character belonging to one team is in possession of the moving object, selecting one or more player characters from among player characters belonging to another team; first player character control means for moving the player character selected by the selection means, based on a position of the moving object or the player character in possession of the moving object, while restricting movement of the player character selected by the selection means so that a distance between the moving object or the player character in possession of the moving object, and the player character selected by the selection means, is kept equal to or longer than a predetermined distance; second player character control means for moving the player character selected by the selection means, based on the position of the moving object or the player character in possession of the moving object, such that the player character selected by the selection means approaches the moving object or the player character in possession of the moving object; determination means for determining, in a case where control by the first player character control means is applied, whether or not a reference period has elapsed after a given reference time; and switching means for, in a case where it is determined that the reference period has elapsed after the reference time, switching a state in which control by the first player character control means is applied to a state in which control by the second player character control means is applied, wherein the determination means includes reference period control means for changing a length of the reference period, based on the game state information.

An information storage medium according to the present invention is a computer readable information storage medium storing the above described program. A program distribution device according to the present invention is a program distribution device having an information storage medium storing the above described program, for reading the program from the information storage medium and distributing the program. A program distribution method according to the present invention is a program distribution method for reading the above described program, from an information storage medium storing the program, and distributing the program.

The present invention relates to a game device for carrying out a game (sport game) of a sport to be performed between a first team and a second team, using a moving object. According to the present invention, game state information describing a game state is stored. In a case where a player character belonging to one team is in possession of the moving object, one or more player characters are selected from among the player characters belonging to the other team. First player character control means moves the selected player character, based on the position of the moving object or the player character in possession of the moving object, while restricting the movement of the selected player character so that a distance between the moving object or the player character in possession of the moving object, and the selected player character, is kept equal to or longer than a predetermined distance. Second player character control means moves the selected player character, based on the position of the moving object or the player character in possession of the moving object, such that the selected player character approaches the moving object or the player character in possession of the moving object. According to the present invention, in a case where control by the first player character control means is performed, whether or not a reference period has elapsed after a given reference time is determined. In a case where it is determined that a reference period has elapsed after a reference time, a state in which control by the first player character control means is performed is switched to a state in which control by the second player character control means is performed. According to the present invention, the length of the reference period is changed, based on the game state information. According to the present invention, it is possible to arrange such that a user can feel a difference in the state of mind between a player of a winning team and a player of a losing team when defending.

According to one embodiment of the present invention, the reference period control means may include means for storing data correlating the game state information and reference period information concerning the length of the reference period, and means for controlling the length of the reference period, based on the reference period information correlated to the game state information.

According to another embodiment of the present invention, the switching means may include means for determining, in a case where control by the first player character control means is applied, whether or not the distance between the moving object and the player character in possession of the moving object is equal to or longer than a predetermined distance, and means for, in a case where control by the first player character control means is applied and it is determined that the distance between the moving object and the player character in possession of the moving object is equal to or longer than the predetermined distance, switching the state in which control by the first player character control means is applied to the state in which control by the second player character control means is applied.

According to still another embodiment of the present invention, the switching means may include means for determining whether or not a number of player characters selected by the selection means is equal to or larger than a predetermined number, and means for, in a case where it is determined that the number of player characters selected by the selection means is equal to or larger than the predetermined number, causing the second player character control means control the player character selected by the selection means.

BEST MODE FOR CARRYING OUT THE INVENTION

In the following, one example of an embodiment of the present invention will be described in detail with reference to the accompanying drawings. A game device according to an embodiment of the present invention is realized, using, e.g., a consumer game device (an installation type game device), a portable game device, a portable phone, a personal digital assistant (PDA), a personal computer, or the like. Here, an example in which a consumer game device is used to realize a game device according to an embodiment of the present invention will be described.

Figure 1:
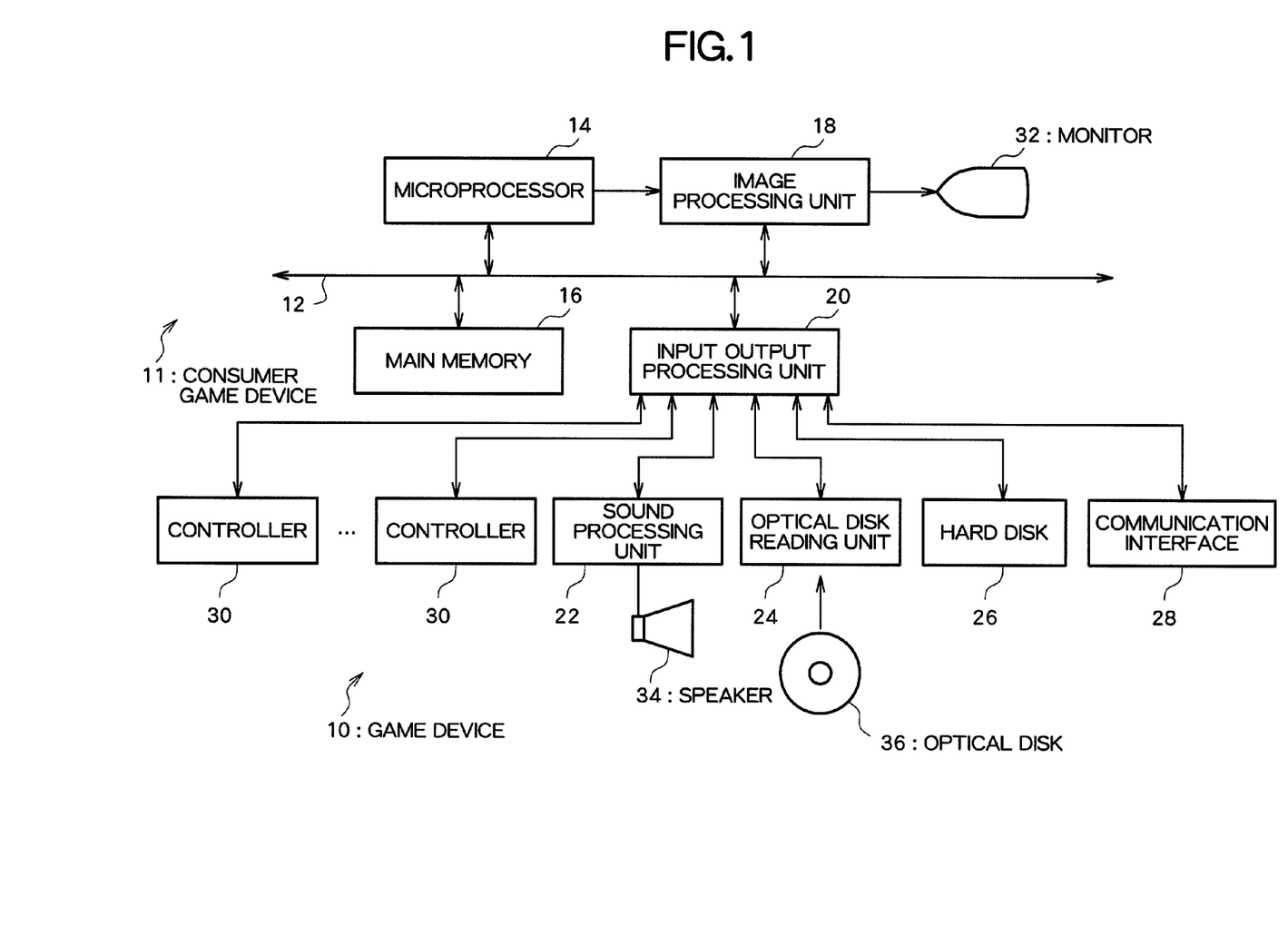
FIG. 1 is a diagram showing a hardware structure of a game device according to this embodiment.

FIG. 1 is a diagram showing an overall structure of a game device according to an embodiment of the present invention. The game device 10 shown in FIG. 1 comprises a consumer game device 11, a monitor 32, a speaker 34, and an optical disk 36 (an information storage medium). The monitor 32 and the speaker 34 are connected to the consumer game device 11. For example, a home-use television set receiver is used as the monitor 32, and, e.g., a speaker incorporated in a home-use television set receiver is used as the speaker 34.

The consumer game device 11 is a publicly known computer game system. The consumer game device 11 comprises a bus 12, a microprocessor 14, a main memory 16, an image processing unit 18, an input output processing unit 20, a sound processing unit 22, an optical disk reading unit 24, a hard disk 26, a communication interface 28, and a controller 30. Structural components other than the controller 30 are accommodated in an enclosure of the consumer game device 11.

The microprocessor 14 controls the respective units of the consumer game device 11, based on an operating system stored in a ROM (not shown) or a program read from the optical disk 36 or the hard disk 26. The main memory 16 includes, e.g., a RAM. A program and data read from the optical disk 36 or the hard disk 26 is written, when necessary, into the main memory 16. The main memory 16 is used also as a working memory of the microprocessor 14. The bus 12 is used to exchange address and data among the respective units of the consumer game device 11. The microprocessor 14, the main memory 16, the image processing unit 18, and the input output processing unit 20 are connected for mutual data communication via the bus 12.

The image processing unit 18 includes a VRAM, and renders a game screen image into the VRAM, based on the image data sent from the microprocessor 14. Further, the image processing unit 18 converts the game screen image rendered in the VRAM into a video signal to output to the monitor 32 at a predetermined time.

The input output processing unit 20 is an interface for the microprocessor 14 to access the sound processing unit 22, the optical disk reading unit 24, the hard disk 26, the communication interface 28, and the controller 30. The sound processing unit 22 has a sound buffer, and reproduces various sound data including game music, game sound effects, message, and so forth, read from the optical disk 36 or the hard disk 26 into the sound buffer to output via the speaker 34. The communication interface 28 is an interface for connecting the consumer game device 11 to a communication network, such as the Internet, or the like in either a wired or wireless manner.

The optical disk reading unit 24 reads a program and data recorded on the optical disk 36. Note that although the optical disk 36 is used here to supply a program and data to the consumer game device 11, any other information storage medium, such as a memory card, or the like, may be used instead. Alternatively, a program and data may be provided from a remote place to the consumer game device 11 via a communication network, such as, e.g., the Internet, or the like. The hard disk 26 is a typical hard disk device (an auxiliary memory device).

The controller 30 is a general purpose operation input means for a user to input various game operations. A plurality of controllers 30 can be connected to the consumer game device 11. The input output processing unit 20 scans the state of the controller 30 every predetermined cycle (e.g., every $\frac{1}{60}^{th}$ of a second), and sends an operating signal indicating a scanning result to the microprocessor 14 via the bus 12. The microprocessor 14 determines a game operation carried out by a user, based on the operating signal. Note that the controller 30 may be connected to the consumer game device 11 in either a wired or wireless manner.

In the game device 10 having the above described structure, e.g., a soccer game imitating a soccer match performed between a first team and a second team is carried out. The following description is given, based on the assumption that the first team is operated by a user, and the second team is operated by a computer. However, alternatively, the first team may be operated by a computer, and the second team may be operated by another user. The soccer game is realized by executing a program read from the optical disk 36 or the hard disk 26.

Figure 2:
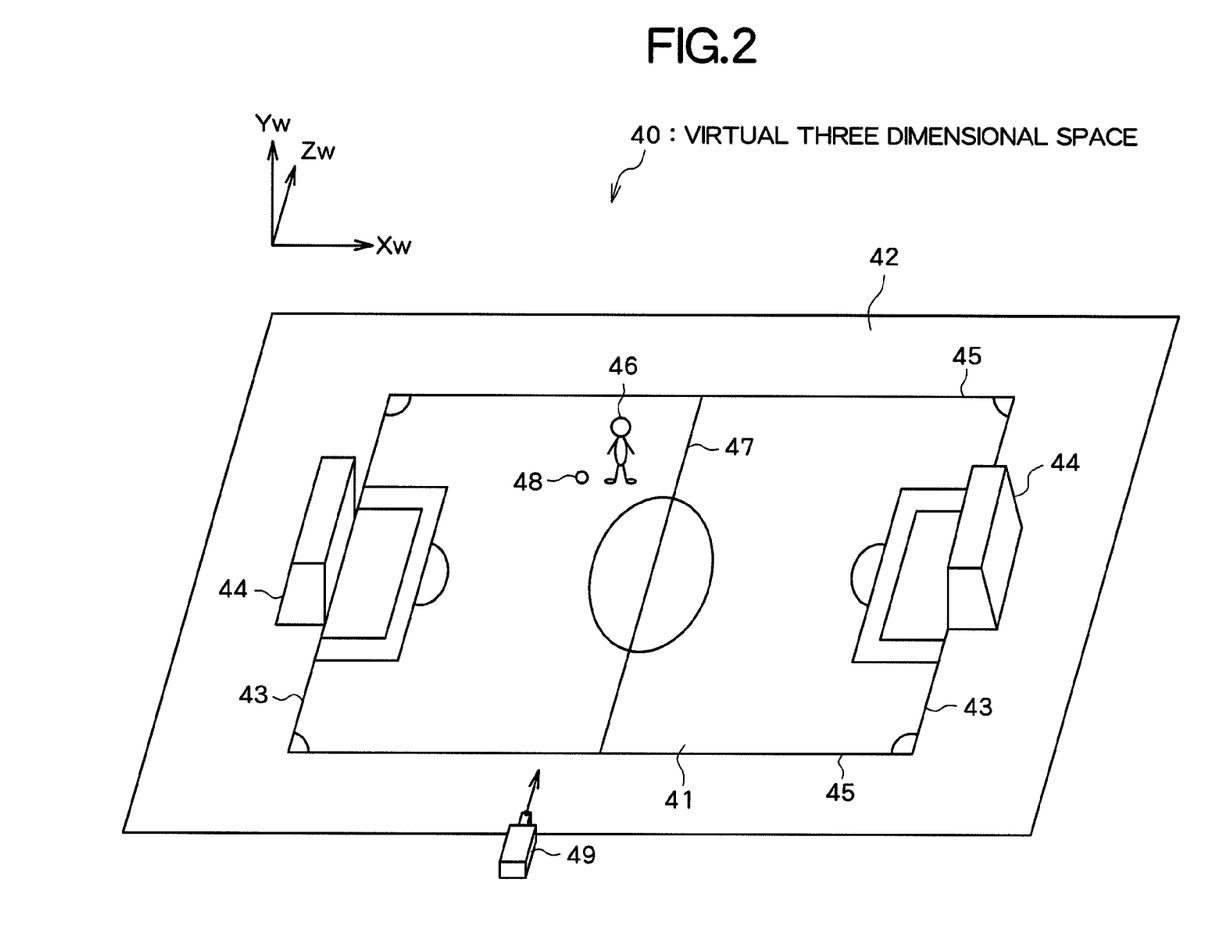
FIG. 2 is a diagram showing one example of a virtual three dimensional space.

In order to realize the above-described soccer game, a virtual three dimensional space (a game space) is created in the main memory 16. FIG. 2 shows one example of a virtual three dimensional space. As shown in FIG. 2, a field object 42 representative of a soccer field is placed in the virtual three dimensional space 40. For example, goal lines 43 (end lines), touch lines 45 (side lines), and a half-way line 47 are defined on the field object 42. A soccer match is carried out on a pitch 41, or an area enclosed by the goal lines 43 and the touch lines 45. Further, a goal object 44 representative of a goal, a player object 46 (player character) representative of a soccer player, and a ball object 48 representative of a soccer ball (moving object) are placed on the field object 42. Although not shown in FIG. 2, eleven player objects 46 belonging to the first team and another eleven player objects 58 belonging to the second team are placed on the field object 42.

One of the goal objects 44 is correlated to the first team; the other is correlated to the second team. With the ball object 48 having moved into the inside of the goal object 44 correlated to one team, a score event occurs to the other team. In the following, an area between the goal line 43 corresponding to the goal object 44 of the first team and the half-way line 47 is referred to as the first team's "own half". Similarly, an area between the goal line 43 corresponding to the goal object 44 of the second team and the half-way line 47 is referred to as the second team's "own half".

A virtual camera 49 (viewpoint) is set in the virtual three dimensional space 40. The virtual camera 49 moves in the virtual three dimensional space 40, based on, e.g., the movement of the ball object 48. A game screen image showing a picture obtained by viewing the virtual three dimensional space 40 from the virtual camera 49 is displayed on the monitor 32.

When the player object 46 and the ball object 48 get closer to each other, the player object 46 and the ball object 48 are caused to be correlated to each other under a predetermined condition. The ball object 48 moves according to the movement of the player object 46. This is expressed as the player object 46 being engaged in a dribble action. A state in which the ball object 48 is correlated to a player object 46 will be hereinafter referred to as "a player object 46 in possession of the ball object 48".

When a player object 46 belonging to one team is in possession of the ball object 48 and a player object 46 belonging to the other team and the ball object 48 then get closer to each other, the ball object 48 is caused to be correlated to the player object 46 of the other team under a predetermined condition. In this manner, a player object 46 takes the ball object 48 from the other player object 46 that was in possession of the ball object 48.

In the above-described soccer game, when a player object 46 belonging to one team is in possession of the ball object 48 and a user or a computer operating the other team then instructs application of "press defense", one or more player objects 46 are selected from among the player objects 46 belonging to the other team and begin "press defense". "Press defense" refers to a defending action of approaching a player object 46 in possession of the ball object 48 (or the ball object 48) to thereby pressure the player object 46 in possession of the ball object 48.

In an actual sport match, a player of a winning team can defend with plenty of poise, while a player of a losing team cannot. In the following, a technique for allowing a user to feel such a difference in the state of mind between a player of a winning team and a player of a losing team when defending will be described.

Figure 3:
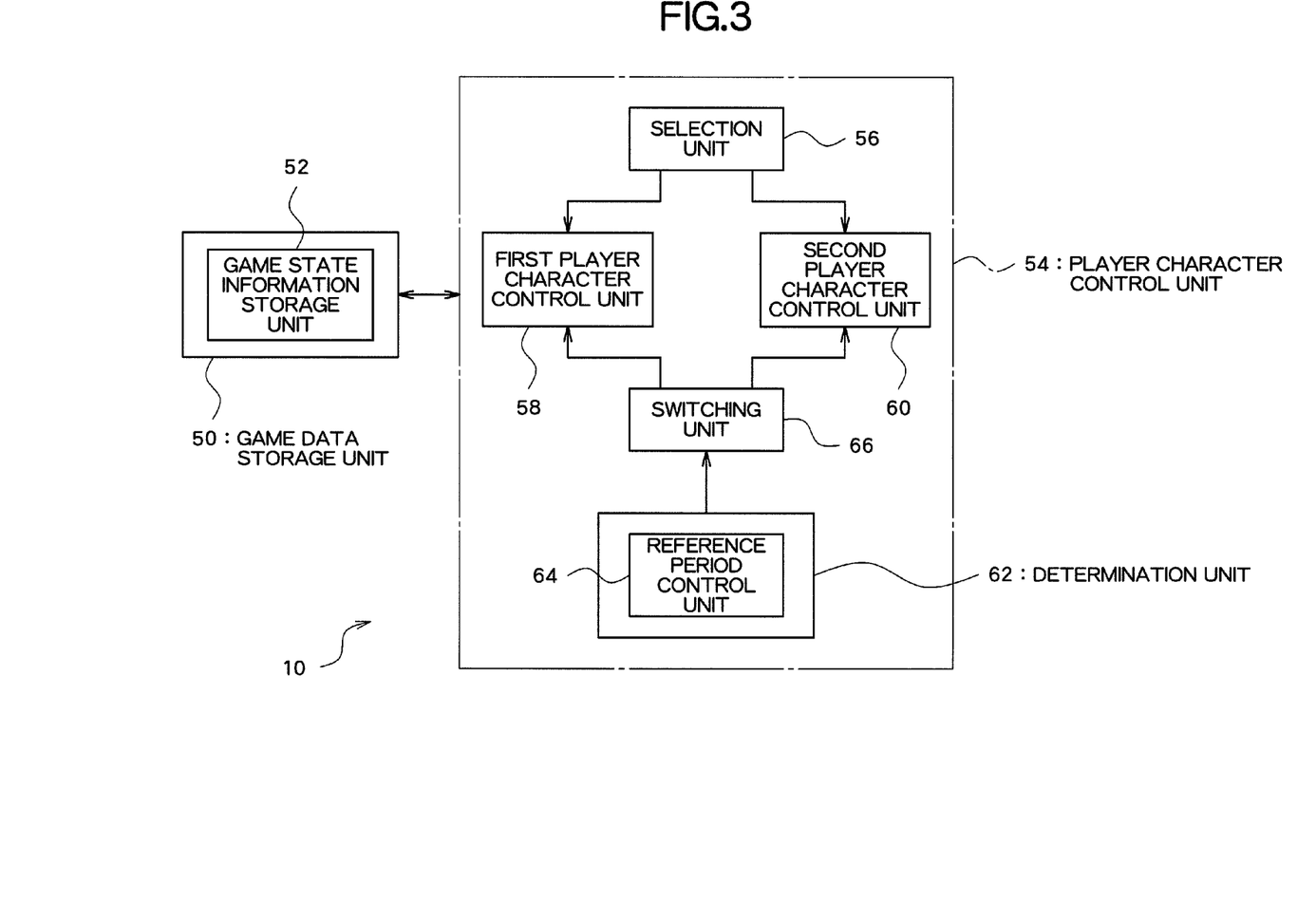
FIG. 3 is a functional block diagram of a game device according to this embodiment.

FIG. 3 is a functional block diagram mainly showing the functions related to the present invention among those realized in the game device 10. As shown in FIG. 3, the game device 10 comprises a game data storage unit 50 and a player character control unit 54. These function blocks are realized by the microprocessor 14 by executing a program.

The game data storage unit 50 is realized, using, e.g., the main memory 16, the hard disk 26, or the optical disk 36. The game data storage unit 50 stores game data for carrying out a soccer game. For example, data describing the state (position, posture, movement direction, and so forth) of a player object 46, data describing the state (position, movement direction, and so forth) of the ball object 48, and data describing the state (position, viewing direction, and so forth) of the virtual camera 49 are stored in the game data storage unit 50. Also, data indicating a player object 46 in possession of the ball object 48 is stored in the game data storage unit 50.

The game data storage unit 50 includes a game state information storage unit 52. The game state information storage unit 52 stores game state information describing a game state. For example, game state information includes score information indicating the scores of the first team and the second team. The game state information also includes, e.g., information indicating ball possession rates of the first team and the second team, information indicating the numbers of corner kicks and shots attempted by the first team and the second team, and information indicating the numbers of yellow cards and red cards given to the first team and the second team. That is, game state information can be considered as information telling which of the first team and the second team is winning.

The player character control unit 54 is realized mainly using the microprocessor 14. When a player object 46 belonging to one team is in possession of the ball object 48 and a user or a computer operating the other team then instructs application of "press defense", the player character control unit 54 causes one or more player objects 46 selected from among the player objects 46 belonging to the other team to begin "press defense". Note that the player character control unit 54 comprises a selection unit 56, a first player character control unit 58, a second player character control unit 60, a determination unit 62, and a switching unit 66.

When a player object 46 belonging to one team is in possession of the ball object 48 and a user or a computer operating the other team then instructs application of "press defense", the selection unit 56 selects one or more player objects 46 from among the player objects 46 belonging to the other team. For example, the selection of a player object 46 may be automatically carried out, based on the positions of the respective player objects 46 belonging to the team operated by the user or computer having instructed application of "press defense" and the position of the ball object 48 (or the player object 46 in possession of the ball object 48). For example, a player object 46 located closest to the ball object 48 (or the player object 46 in possession of the ball object 48) may be selected. Note that when a user instructs application of "press defense", the selection of a player object 46 may be carried out according to the selection operation by the user. In this case, one or more player objects 46 selected by the user perform "press defense".

The first player character control unit 58 causes the player object 46 selected by the selection unit 56 to move, based on the position of the ball object 48 (or the player object 46 in possession of the ball object 48). In the above, however, the movement of the player object 46 selected by the selection unit 56 is restricted by the first player character control unit 58 so that a distance between the ball object 48 (or the player object 46 in possession of the ball object 48) and the player object 46 selected by the selection unit 56 is kept equal to or longer than a predetermined distance.

For example, the first player character control unit 58 sets, as a movement destination position, a position away from the position of the ball object 48 (or the player object 46 in possession of the ball object 48) by a predetermined distance or longer, and causes the player object 46 selected by the selection unit 56 to move towards the movement destination position.

Figure 4:
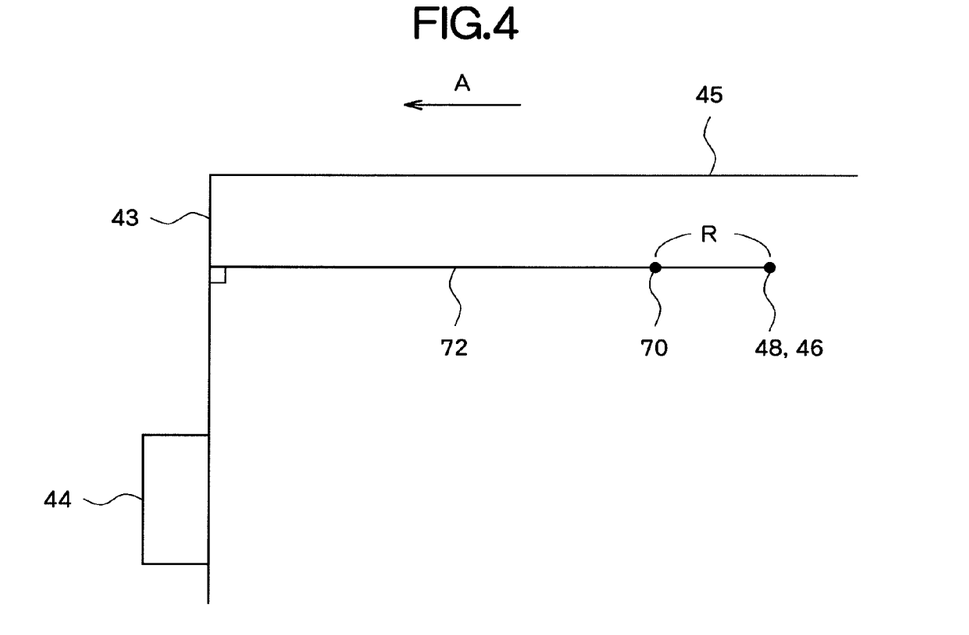
FIG. 4 is a diagram showing one example of a method for setting a movement destination position.

In the following, a method for setting a movement destination position will be described. FIG. 4 is a diagram explaining one example of a method for setting a movement destination position. In FIG. 4, suppose that a player object 46 in possession of the ball object 48 pushes in the left direction (direction A in FIG. 4). The straight line 72 shown in FIG. 4 is parallel to the touch line 45 and extends from the position of the ball object 48 (or the player object 46 in possession of the ball object 48) toward the goal line 43 on the side of the goal object 44 protected by the player object 46 selected by the selection unit 56. According to the method shown in FIG. 4, the movement destination position 70 is set to a position on the straight line 72, away from the position of the ball object 48 (or the player object 46 in possession of the ball object 48) by a predetermined distance R.

Figure 5:
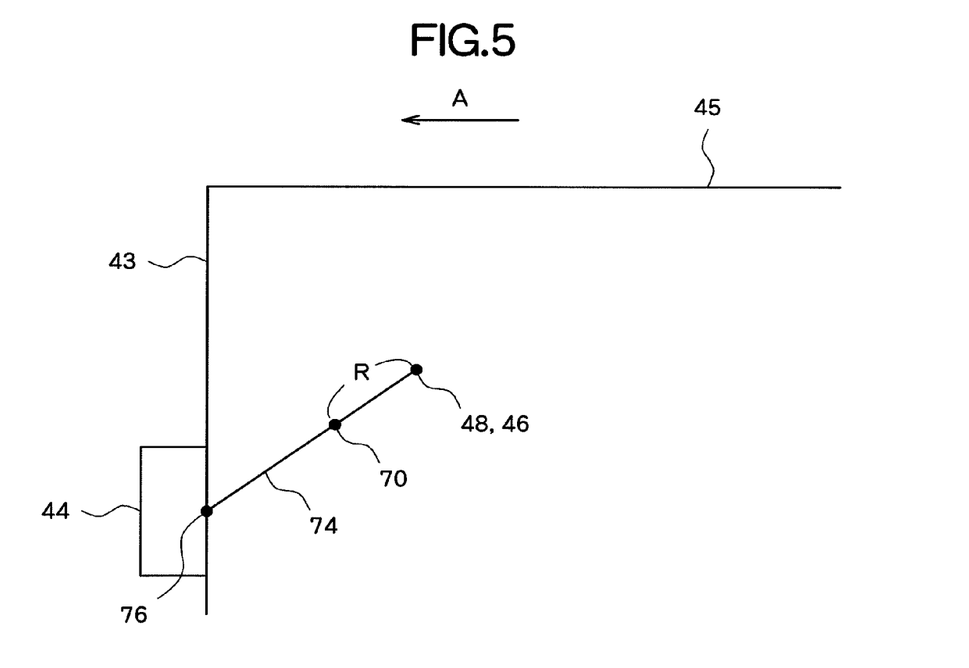
FIG. 5 is a diagram showing another example of a method for setting a movement destination position.

FIG. 5 is a diagram explaining another example of a method for setting a movement destination position. Also in FIG. 5, suppose that the player object 46 in possession of the ball object 48 pushes in the left direction (direction A in FIG. 5). The straight line 74 shown in FIG. 5 extends from the position of the ball object 48 (or the player object 46 in possession of the ball object 48) toward the representative point 76 of the goal object 44 protected by the player object 46 selected by the selection unit 56. According to the method shown in FIG. 5, the movement destination position 70 is set to a position on the straight line 74, away from the position of the ball object 48 (or the player object 46 in possession of the ball object 48) by a predetermined distance R.

The methods shown in FIG. 4 and FIG. 5 are selectively used, e.g., as follows. For example, the method shown in FIG. 5 is used in a case where a player object 46 in possession of the ball object (or the ball object 48) is located in an area away by a predetermined distance or shorter from the goal line 43 on the side of the goal object 44 protected by the player object 46 selected by the selection unit 56, and the method shown in FIG. 4 is used in other cases.

Note, e.g., that the movement destination position may be set on the circumference of a circle with the center being the position of the ball object 48 (or a player object 46 in possession of the ball object 48) and the radius being a predetermined distance R or longer.

The second player character control unit 60 causes the player object 46 selected by the selection unit 56 to move toward the ball object 48 (or a player object 46 in possession of the ball object 48). In this case, different from the case in which control by the first player character control unit 58 is applied, restriction of the movement of the player object 46 selected by the selection unit 56 so as to keep the distance between the ball object 48 (or the player object 46 in possession of the ball object 48) and the player object 46 selected by the selection unit 56 equal to or longer than a predetermined distance is not applied, and the player object 46 selected by the selection unit 56 is resultantly controlled so as to approach the ball object 48 (or the player object 46 in possession of the ball object 48).

In this embodiment, the second player character control unit 60 sets the position of the ball object 48 (or a player object 46 in possession of the ball object 48) as a movement destination position, and causes the player object 46 selected by the selection unit 56 to move toward the movement destination position.

The player object 46 selected by the selection unit 56 is initially controlled by the first player character control unit 58. Then, the determination unit 62 determines, in a case where control by the first player character control unit 58 is being applied, whether or not a reference period has elapsed after a given reference time. A reference time refers to a time based on a time at which application of "press defense" is instructed, a time based on a time at which selection by the selection unit 56 is made, or a time based on a time at which control by the first player character control unit 58 begins. A time based on a time at which application of "press defense" is instructed may be the actual time at which application of "press defense" is instructed or a time after elapse of a predetermined period of time after a time at which application of "press defense" is instructed. This kind of alternative is similarly applied to a time based on a time at which selection by the selection unit 56 is made and a time based on a time at which control by the first player character control unit 58 begins.

The determination unit 62 includes a reference period control unit 64. The reference period control unit 64 changes the length of the above-described reference period, based on the game state information. For example, the reference period control unit 64 stores data correlating game state information and reference period information concerning the length of a reference period. The reference period control unit 64 obtains reference period information correlated to the current game state information, based on the data stored, and determines the length of the reference period, based on the reference period information. Note that the above-described data may be table type data or expression type data. The above-described data may be stored as a part of a program. For example, the above-described data is data correlating a game state condition concerning game state information and reference period information. In this case, the reference period control unit 64 determines the length of a reference period, based on the reference period information correlated to a game state condition satisfied by the current game state information.

Figure 6:
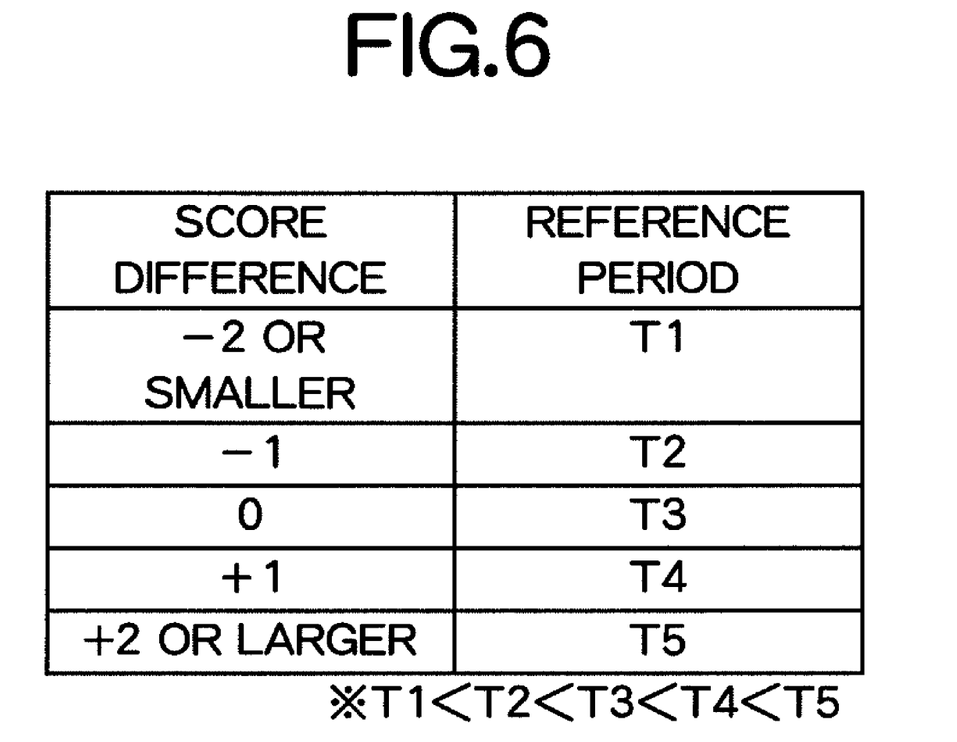
FIG. 6 is a diagram showing one example of reference period data.

FIG. 6 shows one example of reference period data stored in the reference period control unit 64. The reference period data shown in FIG. 6 is data correlating a "score difference" and a "reference period". A "score difference" refers to a difference in score between the team operated by a user or a computer having instructed application of "press defense" and the opponent team (that is, the team to which a player object 46 in possession of the ball object 48 belongs). Note that a case in which a "score difference" is a negative value refers to a case in which the score of the team operated by a user or a computer having instructed application of "press defense" is smaller than that of the opponent team, and a case in which a "score difference" is a positive value refers to a case in which the score of the team operated by a user or a computer having instructed application of "press defense" is larger than that of the opponent team. The reference period control unit 64 controls the above-described reference period, based on the reference period data. Note that T1 to T5 in FIG. 6 satisfy $T1<T2<T3<T4<T5$.

In the following, assume a case in which a player object 46 belonging to the first team is in possession of the ball object and a computer operating the second team then instructs application of "press defense". In this case, when the score of the second team is larger by one than that of the first team, the reference period is set to T4, and when the score of the second team is smaller by one than that of the first team, the reference period is set to T2. In this manner, a relatively long reference period is set when the second team is winning, and a relatively short reference period is set when the second team is losing. When the score of the second team is larger by two or more than that of the first team, the reference period is set to a period (T5) which is longer than the reference time (T4) set for a case in which the score of the second team is larger by one than that of the first team. That is, when the second team is winning, or ahead, a longer reference period is set in accordance with an extent of to which they are ahead in score. Meanwhile, when the score of the second team is smaller by two or more than that of the first team, the reference period is set to a period (T1) which is shorter than the reference time (T2) set for a case in which the score of the second team is smaller by one than that of the first team. That is, when the second team is losing, or behind, a shorter reference period is set in accordance with an extent by which they are behind in score.

Note that the reference period control unit 64 may store reference periods for three respective cases: (1) a case in which the team operated by a user or a computer having instructed application of "press defense" is ahead of the opponent team, (2) a case in which the team operated by a user or a computer having instructed application of "press defense" is behind the opponent team, and (3) a case in which the score of the team operated by a user or a computer having instructed application of "press defense" is equal to that of the opponent team.

Note that although an example is described in the above in which a reference period is controlled, based on the scores of the respective teams, a reference period may be controlled based solely on the score of one team. Here, assume a case in which a computer operating the second team instructs application of "press defense". In this case, a reference period may be controlled based solely on the score of the second team. That is, for example, a longer reference period may be set with respect to a larger score of the second team. Alternatively, a reference period may be controlled based solely on the score of the first team. In this case, a shorter reference period may be set with respect to a larger score of the first team.

The reference period control unit 64 may use information other than score information as game state information. In this case also, a relatively long reference period may be set when a team engaged in "press defense" is presumed to be winning, and a relatively short reference period may be set when a team engaged in "press defense" is presumed to be losing.

The switching unit 66 causes either the first player character control unit 58 or the second player character control unit 60 to control the player object 46 selected by the selection unit 56. Specifically, initially the switching unit 66 causes the first player character control unit 58 to control the player object 46 selected by the selection unit 56, and in a case where it is determined that a reference period has elapsed after a reference time while the first player character control unit 58 is controlling the player object 46 selected by the selection unit 56, the switching unit 66 switches the state in which control by the first player character control unit 58 is applied to a state in which control by the second player character control unit 60 is applied.

As described above, according to the game device 10, in a case where a user or a computer instructs application of "press defense", one or more player objects 46 begin "press defense". In the above, initially, the one or more player objects 46 mark the player object 46 in possession of the ball object 48 while keeping a predetermined distance or longer with respect the ball object 48 to thereby pressure the player object 46 in possession of the ball object 48. This operation mode is hereinafter referred to as a "first operation mode". Then, after elapse of a reference period, the player objects 46 engaged in "press defense" approach the ball object 48 and try to take the ball object 48 from the player object 46 in possession of the ball object 48. This operation mode is hereinafter referred to as a "second operation mode". Note that the first operation mode is an operation mode realized by the first player character control unit 58, while the second operation mode is an operation mode realized by the second player character control unit 60.

According to the game device 10, in particular, the length of the above described reference period will change depending on the state of a game, and as a result a user can feel a difference in the state of mind between a player of a winning team and a player of a losing team when defending.

Here, suppose that a computer operating the second team instructs application of "press defense" when the score of the second team is larger than that of the first team. In this case, it is presumed that a player of the second team, which is ahead of the first team (that is, the second team is beating the first team), can defend with plenty of poise. In view of the above, in the game device 10, a relatively long reference period is set when the score of the second team is larger than that of the first team. Accordingly, it is ensured that a period in which a player object 46 engaged in "press defense" keeps marking the player object 46 in possession of the ball object 48, while keeping a predetermined distance or longer with respect to the ball object 48, will be longer. This can give a user an impression that defense is being carried out with plenty of poise.

Meanwhile, suppose that a computer operating the second team instructs application of "press defense" when the score of the second team is lower than that of the first team. In this case, it is presumed that a player of the second team, which is behind the first team (that is, the second team is losing to the first team), cannot defend with plenty of poise. In view of the above, in the game device 10, a relatively short reference period is set when the score of the second team is lower than that of the first team. That is, it is ensured that a period in which a player object 46 engaged in "press defense" keeps marking the player object 46 in possession of the ball object 48, while keeping a predetermined distance or longer with respect to the ball object 48, will be shorter, and accordingly the player object 46 engaged in "press defense" tries to take the ball object 48 from the player object 46 in possession of the ball object 48 relatively early. This can give a user an impression that defense is not carried out with plenty of poise.

Figure 7:
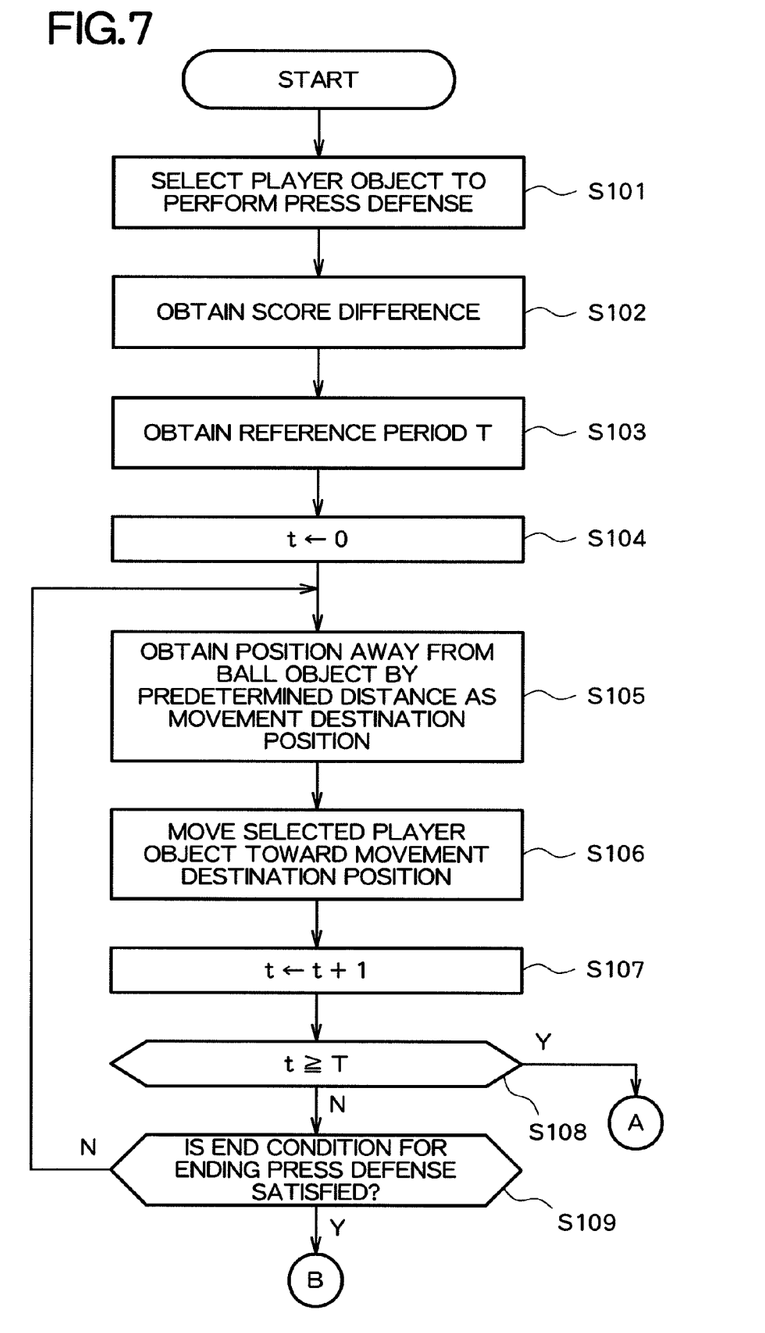
FIG. 7 is a flowchart of a process to be carried out by a game device.
Figure 8:
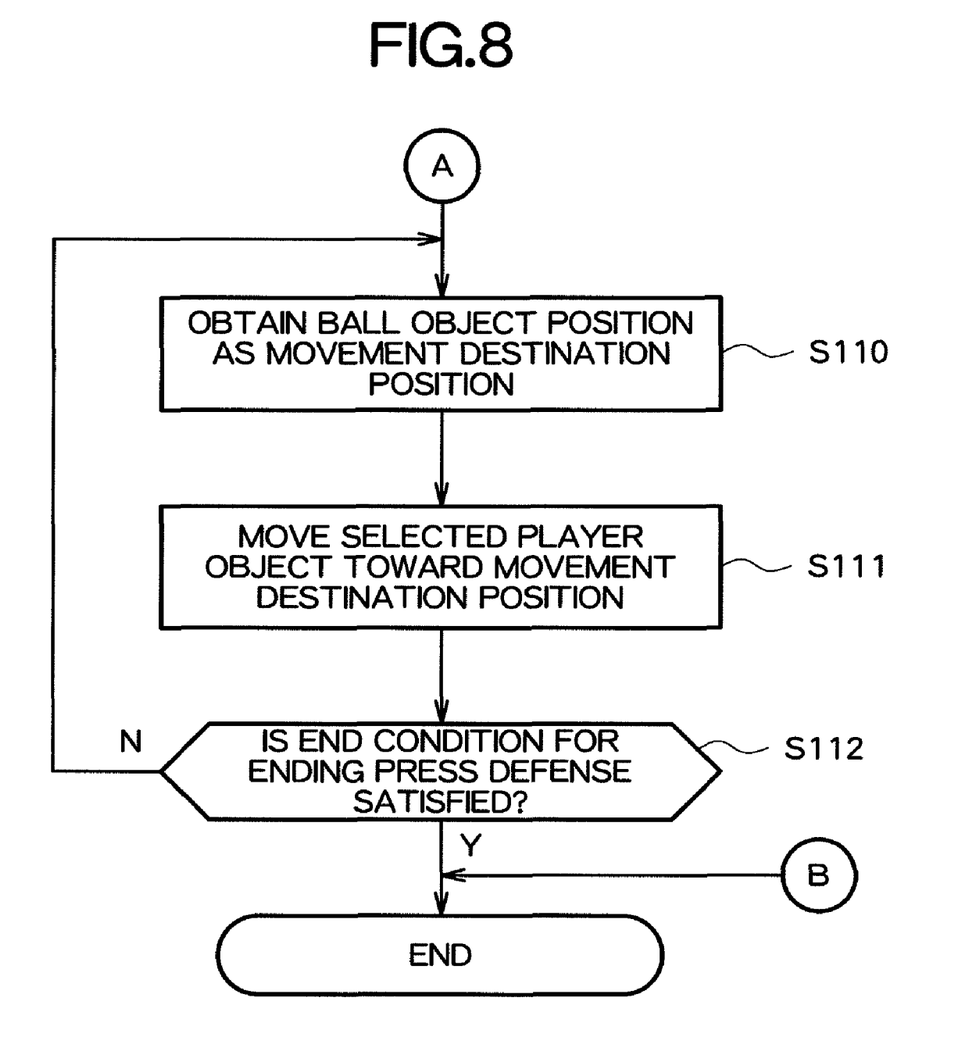
FIG. 8 is a flowchart of a process to be carried out by a game device.

In the following, a process to be carried out by the game device 10 to realize the above-described function blocks will be described. FIGS. 7 and 8 are flowcharts of a process to be carried out in a case where a player object 46 belonging to one team is in possession of the ball object 48 and a user or a computer operating the other team then instructs application of "press defense". Specifically, a case in which a player object 46 belonging to the first team is in possession of the ball object 48 and a computer operating the second team then instructs application of "press defense" will be described as an example. The microprocessor 14 carries out a process shown in FIGS. 7 and 8 according to a program stored in the optical disk 36 or the hard disk 26.

As shown in FIG. 7, initially the microprocessor 14 (selection unit 56) selects one or more player objects 46 from among the player objects 46 belonging to the second team to have them carry out press defense (S101). For example, a player object 46 located closest to the ball object 48 (or a player object 46 in possession of the ball object 48) may be selected. Note that when a user operating the first team instructs application of "press defense", a player object 46 may be selected from among the player objects 46 belonging to the first team according to the selection operation by the user.

Thereafter, the microprocessor 14 obtains a score difference between the first team and the second team (S102). Specifically, the microprocessor 14 reads the score (P1) of the first team and the score (P2) of the second team, and calculates a score difference $\Delta P=P2-P1$. Note that a score difference $\Delta P=P2-P1$ is calculated here since a case in which a computer operating the second team instructs application of "press defense" is described here. Meanwhile, when a user operating the first team instructs application of "press defense", a score difference $\Delta P=P1-P2$ is calculated at this step.

Thereafter, the microprocessor 14 (reference period control unit 64) reads a reference period T corresponding to the score difference $\Delta P$ obtained at S102 from the reference period table (S103). Note that the reference periods T1 to T5 in FIG. 6 are numeric values indicating a reference period in units of $\frac{1}{60}^{th}$ of a second. Then, the microprocessor 14 initializes the value of the variable t to the initial value (0) (S104). The variable t is used to measure a period of time having elapsed after the player object 46 selected at S101 begins operating in the first operating mode.

Thereafter, every predetermined period of time ($\frac{1}{60}^{th}$ of a second in this embodiment) the microprocessor 14 carries out a process (S105 to S109) for causing the player object 46 selected at S101 to operate in the first operation mode. Note that although not shown in FIG. 7, a process for controlling the ball object 48 and other player objects 46 is carried out in parallel with the process at S105 to S109.

Initially, the microprocessor 14 (first player character control unit 58) obtains a position apart from the position of the ball object 48 by a predetermined distance R as a movement destination position (S105). At this step, a movement destination position is obtained, using, e.g., the method shown in FIG. 4 or FIG. 5. Then, the microprocessor 14 (first player character control unit 58) moves the player object 46 selected at S101 toward the movement destination position obtained at S105 (S106). For example, the position of the player object 46 selected at S101 is updated to a position displaced from the current position toward the movement destination position by a movement distance corresponding to a predetermined period of time ($\frac{1}{60}^{th}$ of a second).

Thereafter, the microprocessor 14 (the determination unit 62) adds one to the value of the variable t (S107), and determines whether or not the value of the variable t is equal to or larger than the reference period T obtained at S103 (S108). If the value of the variable t is smaller than the reference period T, the microprocessor 14 determines whether or not an end condition for ending the "press defense" is satisfied (S109). A case in which an end condition for ending the "press defense" is satisfied is a case in which, for example, suspension of "press defense" is instructed or a different player object 46 obtains the ball object 48. Meanwhile, if an end condition for ending "press defense" is not satisfied, the microprocessor 14 again carries out the process at S105 to S109.

Meanwhile, if the value of the variable t is equal to or larger than the reference period T (S108: Y), the microprocessor 14 carries out a process (S110 to S112) for causing the player object 46 selected at S101 to operate in the second operation mode, every predetermined period of time ($\frac{1}{60}^{th}$ of a second in this embodiment). Note that although not shown in FIG. 8, a process for controlling the ball object 48 and other player objects 46 is carried out in parallel with the process at S110 to S112.

Specifically, as shown in FIG. 8, the microprocessor 14 (second player character control unit 60) initially obtains the position of the ball object 48 as a movement destination position (S110). Then, the microprocessor 14 (second player character control unit 60) moves the player object 46 selected at S101 toward the movement destination position obtained at S110 (S111). For example, the position of the player object 46 selected at S101 is updated to a position displaced from the current position toward the movement destination position by a movement distance corresponding to a predetermined period of time ($\frac{1}{60}^{th}$ of a second). Thereafter, the microprocessor 14 determines whether or not an end condition for ending "press defense" is satisfied (S112). The process at this step is carried out similar to that at S109. If an end condition for ending the "press defense" is not satisfied, the microprocessor 14 again carries out the process at S110 to S112.

Note that in the process at S104 in FIG. 7, the variable t may be initialized to the reference period T obtained at S103. In the process at S107, the value of the variable t may be decremented by one. In the process at S108, whether or not the value of the variable t is equal to or smaller than 0 may be determined.

In an actual sport match, a player of a winning team can defend with plenty of poise, while a player of a losing team cannot. According to the above described game device 10, it is possible to allow a user to feel a difference in the state of mind between a player of a winning team and a player of a losing team when defending.

Also, according to the game device 10, restriction is kept imposed for a predetermined period of time to prevent player objects 46 (a player object 46 in possession of the ball object 48 and a player object 46 engaged in "press defense") from getting closer to each other. This makes it possible, depending on a state of a game, to reduce the number of player objects 46 to be shown on the game screen at the same time. This can accordingly reduce a processing load.

It should be noted that the present invention is not limited to the above-described embodiment.

For example, when control by the first player character control unit 58 is applied, the switching unit 66 may monitor whether or not the distance between the ball object 48 and a player object 46 in possession of the ball object 48 is equal to or longer than a predetermined distance. If it is determined that the above-described distance is equal to or longer than a predetermined distance, the switching unit 66 may switch the state in which control by the first player character control unit 58 is applied to a state in which control by the second player character control unit 60 is applied, even before elapse of a reference period after a reference time.

A state in which the ball object 48 is located relatively far away from a player object 46 in possession of the ball object 48 provides a good chance to take the ball object 48. Therefore, if a player object 46 engaged in "press defense" does not try to take the ball object 48 even when the ball object 48 is located relatively far away from the player object 46 in possession of the ball object 48, a user may feel that the movement of the player object 46 is unnatural. Regarding this point, the above described arrangement makes it possible to prevent occurrence of such inconvenience.

For example, the switching unit 66 may determine whether or not the number of player objects 46 selected by the selection unit 56 is equal to or larger than a predetermined number. If the number of player objects 46 selected by the selection unit 56 is equal to or larger than a predetermined number, the switching unit 66 may cause the second player character control unit 60 to carry out control even before elapse of a reference period after a reference time. With the above, the player objects 46 immediately switch to operating in the second operation mode and to try to take the ball object 48 once the number of player objects 46 selected to perform "press defense" exceeds a predetermined number.

A state in which a relatively large number of player objects 46 are engaged in "press defense" provides a good chance, to take the ball object 48. Therefore, if player objects 46 engaged in "press defense" does not try to take the ball object 48 even when a relative large number of player objects 46 are performing "press defense", a user may feel that the movement of the player objects is unnatural. Regarding this point, the above described arrangement makes it possible to prevent occurrence of such inconvenience.

Note that an additional player object 46 to perform "press defense" may be selected even once "press defense" has started. That is, the number of player objects 46 to perform "press defense" can be increased even once "press defense" has started. In this case as well, the player objects 46 may immediately begin to operate in the second operation mode once the number of player objects 46 engaged in "press defense" exceeds a predetermined number.

For example, when a user or a computer instructs application of "press defense", the length of a reference period may be changed based on strength or tactics of at least one team. For example, in a case where a computer operating the second team instructs application of "press defense", the length of a reference period may be changed, based on the strength of the second team. Specifically, for example, if the level of a computer operating the second team can be selected from among a plurality of levels, the length of the reference period may be changed, based on the level of the computer operating the second team. Also, for example, if an ability parameter indicating the ability is set for the second team, the length of a reference period may be changed, based on the ability parameter set for the second team. In the above, when an ability parameter indicating the ability of each player object 46 belonging to the second team is set, a statistical value of the ability parameters of the player objects 46 belonging to the second team may be used as an ability parameter of the second team.

For example, a game to be carried out in the game device 10 is not limited to a game in which a three dimensional game space created based on three coordinate elements is displayed on the game screen. A game to be carried out in the game device 10 may be a game in which a two dimensional game space created based on two coordinate elements is displayed on a game screen. That is, a game to be carried out in the game device 10 may be a game in which the positions, and the like, of a ball and a player character are managed while using two coordinate elements.

Also, for example, a game to be carried out in the game device 10 may be a game to be played by two or more users. Also, for example, a game to be carried out in the game device 10 is not limited to a soccer game, and may be a sport game other than a soccer game. The present invention can be applied to, e.g., a basket ball game performed using a ball (moving object) and an ice hockey game performed using a puck (moving object).

Figure 9:
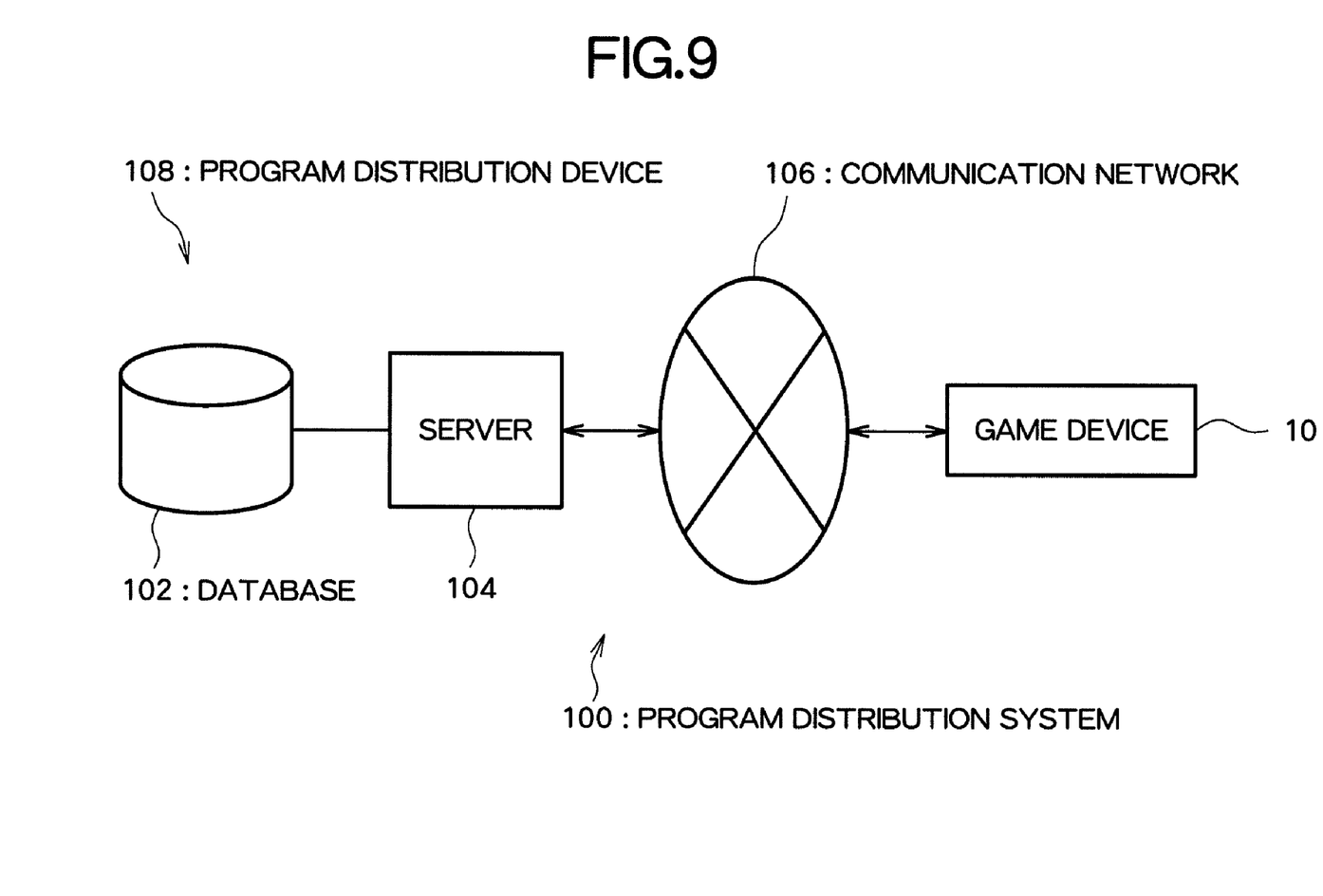
FIG. 9 is a diagram showing an overall structure of a program distribution system according to another embodiment of the present invention.

For example, although a program is supplied to the game device 10 via the optical disk 36 or an information storage medium in the above description, a program may be distributed through a communication network to the game device 10. FIG. 9 is a diagram showing an overall structure of a program distribution system utilizing a communication network. A program distribution method according to the present invention will be described based on FIG. 9. As shown in FIG. 9, the program distribution system 100 comprises a game device 10, a communication network 106, and a program distribution device 108. The communication network 106 includes, e.g., the Internet and/or a cable television network. The program distribution device 108 comprises a database 102 and a server 104. In the system, a program similar to that which is stored in the optical disk 36 is stored in the game database (information storage medium) 102. When a demander requests game distribution, using the game device 10, the request is sent through the communication network 106 to the server 104, and the server 104, in response to the game distribution request, reads the program from the game database 102 and sends the read program to the game device 10. Note that although game distribution is made in response to a game distribution request in the above, the server 104 may send a program one-sidedly. In addition, it is not always necessary to distribute all programs necessary to realize a game at once (collective distribution), and only a portion necessary depending on an aspect of a game may be sent (dividing distribution). Game distribution through the communication network 106 as described above makes it easier for a demander to obtain a program.

The invention claimed is:

1. A game device for carrying out a game of a sport to be performed between a first team and a second team, using a moving object, the game device comprising:
 a game state information storage unit that stores game state information describing a game state;
 a selection unit that, in a case where a player character belonging to one team is in possession of the moving object, selects one or more player characters from among player characters belonging to another team;
 a first player character control unit that moves the selected player character, based on a position of the moving object or the player character in possession of the moving object, while restricting movement of the selected player character so that a distance between the moving object or the player character in possession of the moving object, and the selected player character, is kept equal to or longer than a threshold distance;
 a second player character control unit that moves the selected player character, based on the position of the moving object or the player character in possession of the moving object, such that the selected player character approaches the moving object or the player character in possession of the moving object;
 a determination unit that determines, in a case where control by the first player character control unit is applied, whether or not a reference period has elapsed after a given reference time; and
 a switching unit that, in a case where it is determined that the reference period has elapsed after the reference time, switches a state in which control by the first player character control unit is applied to a state in which control by the second player character control unit is applied,
 wherein
 the determination unit includes a reference period control unit that changes a length of the reference period, based on the game state information.

2. The game device according to claim 1, wherein the reference period control unit
 reads content stored in a storage unit that stores data correlating the game state information and reference period information concerning the length of the reference period, and
 controls the length of the reference period, based on the reference period information correlated to the game state information.

3. The game device according to claim 1, wherein the switching unit determines,
 in a case where control by the first player character control unit is applied, whether or not the distance between the moving object and the player character in possession of the moving object is equal to or longer than a threshold distance, and
 in a case where control by the first player character control unit is applied and it is determined that the distance between the moving object and the player character in possession of the moving object is equal to or longer than the threshold distance, switches the state in which control by the first player character control unit is applied to the state in which control by the second player character control unit is applied.

4. The game device according to claim 1, wherein the switching unit determines
 whether or not a number of player characters selected by the selection unit is equal to or larger than a threshold number, and,
 in a case where it is determined that the number of player characters selected by the selection unit is equal to or larger than the threshold number, causes the second player character control unit to control the selected player character.

5. A control method for controlling a game device for carrying out a game of a sport to be performed between a first team and a second team, using a moving object, the method comprising:
 reading content stored in a game state information storage unit that stores game state information describing a game state;
 in a case where a player character belonging to one team is in possession of the moving object, selecting one or more player characters from among player characters belonging to another team;
 a first player character control operation of moving the selected player character, based on a position of the moving object or the player character in possession of the moving object, while restricting movement of the selected player character so that a distance between the moving object or the player character in possession of the moving object, and the selected player character, is kept equal to or longer than a threshold distance;
 a second player character control operation of moving the selected player character, based on the position of the moving object or the player character in possession of the moving object, such that the selected player character approaches the moving object or the player character in possession of the moving object;

determining, in a case where control by the first player character control operation is applied, whether a reference period has elapsed after a given reference time; and, in a case where it is determined that the reference period has elapsed after the reference time, switching a state in which control by the first player character control operation is applied to a state in which control at the second player character control operation is applied, wherein determining whether the reference period has elapsed includes changing a length of the reference period, based on the game state information.

6. A non-transitory computer readable information storage medium storing a program for causing a computer to function as a game device for carrying out a game of a sport to be performed between a first team and a second team, using a moving object, the program for causing the computer to function as:

a reading unit that reads content stored in a game state information storage that stores game state information describing a game state;

a selection unit that, in a case where a player character belonging to one team is in possession of the moving object, selects one or more player characters from among player characters belonging to another team;

a first player character control unit that moves the selected player character, based on a position of the moving object or the player character in possession of the moving object, while restricting movement of the selected player character so that a distance between the moving object or the player character in possession of the moving object, and the selected player character, is kept equal to or longer than a threshold distance;

a second player character control unit that moves the selected player character, based on the position of the moving object or the player character in possession of the moving object, such that the selected player character approaches the moving object or the player character in possession of the moving object;

a determination unit that determines, in a case where control by the first player character control unit is applied, whether or not a reference period has elapsed after a given reference time; and a switching unit that, in a case where it is determined that the reference period has elapsed after the reference time, switches a state in which control by the first player character control unit is applied to a state in which control by the second player character control unit is applied, wherein the determination unit includes a reference period control unit that changes a length of the reference period, based on the game state information.

7. A game device comprising:

a storage that stores game state information describing a game state of a game being played with a moving object between a first team and a second team;

at least one microprocessor that functions to:

move, during a reference period, one or more player characters from the first team to maintain a threshold distance or longer from the moving object or a player character of the second team that possesses the moving object, and after the reference period has elapsed, move the one or more player characters to approach the moving object or the player character of the second team that possesses the moving object within the threshold distance, wherein the at least one microprocessor changes a length of the reference period based on the game state information.

8. The game device according to claim 7, wherein the at least one microprocessor selects the one or more player characters of the first team from among a plurality of player characters belonging to the first team, based on a distance between the player characters and the moving object or the player character of the second team that possesses the moving object.

9. The game device according to claim 8, wherein the reference period is taken from a reference time.

10. The game device according to claim 7, wherein the reference time comprises a time at which a type of action is instructed, a time at which the one or more player characters of the first team are selected, or a time at which the player character of the second team takes possession of the moving object.

11. The game device according to claim 7, wherein the reference period is taken from a reference time.

12. The game device according to claim 7, wherein the game state information comprises at least one of score information of the first team, score information of the second team, ball possession time of the first team, ball possession time of the second team, shots attempted by the first team, shots attempted by the second team, penalty cards received by the first team, and penalty cards received by second team.

13. A control method of a game device including at least one microprocessor, the method comprising:

storing game state information describing a game state of a game being played with a moving object between a first team and a second team;

moving, using the at least one microprocessor, during a reference period, one or more player characters from the first team to maintain a threshold distance or longer from the moving object or a player character of the second team that possesses the moving object, and after the reference period has elapsed, moving, using the at least one microprocessor, the one or more player characters to approach the moving object or the player character of the second team that possesses the moving object within the threshold distance, wherein a length of the reference period is changed based on the game state information.

14. A non-transitory computer readable information storage medium storing a program for causing a computer to function as a game device, the program for causing the computer to:

store game state information describing a game state of a game being played with a moving object between a first team and a second team;

move, during a reference period, one or more player characters from the first team to maintain a threshold distance or longer from the moving object or a player character of the second team that possesses the moving object, and after the reference period has elapsed, move, using the at least one microprocessor, the one or more player characters to approach the moving object or the player character of the second team that possesses the moving object within the threshold distance, wherein a length of the reference period is changed based on the game state information.

15. A game device for implementing a press defense, the game device comprising:
- a storage that stores game state information describing a game state of a sports game being played with a moving object between a defending team and an offensive team;
- at least one microprocessor that functions to:
  - in response to an instruction to implement a press defense, select one or more player characters from the defending team, and control the selected player character to maintain, for a reference period of time after the instruction, a threshold distance or longer from the moving object or an offensive team player character that possesses the moving object, and
  - after the reference period has elapsed, control the selected player character to approach the moving object or the offensive team player character that possesses the moving object,
- wherein the at least one microprocessor changes a length of the reference period based on the game state information.

16. A control method for implementing a press defense of a game device including at least one microprocessor, the method comprising:
- storing game state information describing a game state of a sports game being played with a moving object between a defending team and an offensive team;
- in response to an instruction to implement a press defense, selecting using the at least one microprocessor one or more player characters from the defending team, and controlling using the at least one microprocessor the selected player character to maintain, for a reference period of time after the instruction, a threshold distance or longer from the moving object or an offensive team player character that possesses the moving object, and
- after the reference period has elapsed, controlling using the at least one microprocessor the selected player character to approach the moving object or the offensive team player character that possesses the moving object,
- wherein a length of the reference period is changed based on the game state information.

17. A non-transitory computer readable information storage medium storing a program for causing a computer to function as a game device for implementing a press defense, the program for causing the computer to:
- store game state information describing a game state of a sports game being played with a moving object between a defending team and an offensive team;
- in response to an instruction to implement a press defense, select one or more player characters from the defending team, and control the selected player character to maintain, for a reference period of time after the instruction, a threshold distance or longer from the moving object or an offensive team player character that possesses the moving object, and
- after the reference period has elapsed, control the selected player character to approach the moving object or the offensive team player character that possesses the moving object,
- wherein a length of the reference period is changed based on the game state information.

* * * * *